(12) United States Patent
Sato et al.

(10) Patent No.: US 8,662,527 B2
(45) Date of Patent: Mar. 4, 2014

(54) AIRBAG DEVICE

(75) Inventors: Masahiro Sato, Wako (JP); Kanichi Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 13/258,149

(22) PCT Filed: Feb. 23, 2010

(86) PCT No.: PCT/JP2010/052686
§ 371 (c)(1),
(2), (4) Date: Sep. 21, 2011

(87) PCT Pub. No.: WO2010/122835
PCT Pub. Date: Oct. 28, 2010

(65) Prior Publication Data
US 2012/0013106 A1  Jan. 19, 2012

(30) Foreign Application Priority Data

Apr. 24, 2009 (JP) .................................. 2009-106833

(51) Int. Cl.
*B60R 21/205* (2011.01)
*B60R 21/233* (2006.01)
*B60R 21/2334* (2011.01)

(52) U.S. Cl.
USPC ........ 280/729; 280/732; 280/742; 280/743.1; 280/743.2

(58) Field of Classification Search
USPC .................... 280/729, 732, 742, 743.1, 743.2

IPC ........... B60R 21/205,21/233, 21/2334, 21/2338
See application file for complete search history.

(56) References Cited

U.S. PATENT DOCUMENTS

| 4,265,468 | A | * | 5/1981 | Suszko et al. | 280/729 |
|---|---|---|---|---|---|
| 5,249,824 | A | * | 10/1993 | Swann et al. | 280/729 |
| 5,253,892 | A | * | 10/1993 | Satoh | 280/731 |
| 5,350,188 | A | * | 9/1994 | Sato | 280/739 |
| 6,283,500 | B1 | * | 9/2001 | Eckert et al. | 280/730.1 |
| 6,802,534 | B2 | * | 10/2004 | Neupert | 280/743.1 |

(Continued)

FOREIGN PATENT DOCUMENTS

| EP | 1498320 | 1/2005 |
|---|---|---|
| JP | 10-329637 | 12/1998 |

(Continued)

OTHER PUBLICATIONS

Japanese Office Action with English translation dated Oct. 22, 2013, 4 pages.

*Primary Examiner* — Paul N Dickson
*Assistant Examiner* — Laura Freedman
(74) *Attorney, Agent, or Firm* — Rankin, Hill & Clark LLP

(57) ABSTRACT

An airbag provided with a pocket. An airbag (21) comprises a main bag body (31), an opening (32) formed in the main bag body (31), a small bag body (33) extending from the opening (32) to the inside of the main bag body, and a joining section (34) at which a part of the small bag body is joined to the main bag body. The joining section (34) is provided in the area which, when the airbag is expanded, extends from both the side surfaces of the airbag or from the top surface (72) of the airbag to the rear surface (73) which comes in contact with and holds the occupant.

5 Claims, 11 Drawing Sheets

(56) References Cited

U.S. PATENT DOCUMENTS

| | | | |
|---|---|---|---|
| 6,846,008 B2 * | 1/2005 | Kamiji et al. | 280/729 |
| 6,981,719 B2 * | 1/2006 | Igawa | 280/743.2 |
| 7,000,943 B2 * | 2/2006 | Hasebe et al. | 280/729 |
| 7,052,042 B2 * | 5/2006 | Sato et al. | 280/743.1 |
| 7,111,866 B2 * | 9/2006 | Abe et al. | 280/729 |
| 7,195,279 B2 * | 3/2007 | Rose et al. | 280/740 |
| 7,281,734 B2 * | 10/2007 | Abe et al. | 280/729 |
| 7,334,812 B2 * | 2/2008 | Abe | 280/729 |
| 7,380,822 B2 * | 6/2008 | Abe | 280/743.1 |
| 7,404,575 B2 * | 7/2008 | Bito et al. | 280/743.1 |
| 7,458,605 B2 * | 12/2008 | Hasebe et al. | 280/729 |
| 7,695,012 B2 * | 4/2010 | Libby et al. | 280/743.1 |
| 7,731,232 B2 * | 6/2010 | Higuchi | 280/739 |
| 7,806,431 B2 * | 10/2010 | Yamada et al. | 280/730.1 |
| 2006/0197320 A1 * | 9/2006 | Abe | 280/729 |
| 2006/0232049 A1 * | 10/2006 | Abe | 280/729 |

FOREIGN PATENT DOCUMENTS

| | | |
|---|---|---|
| JP | 2002-160600 | 6/2002 |
| JP | 2002-166805 | 6/2002 |
| JP | 2003-040066 | 2/2003 |
| JP | 2004-314933 | 11/2004 |
| JP | 2007-038713 | 2/2007 |
| WO | 99/30933 | 6/1999 |
| WO | 2009/019918 | 2/2009 |

* cited by examiner

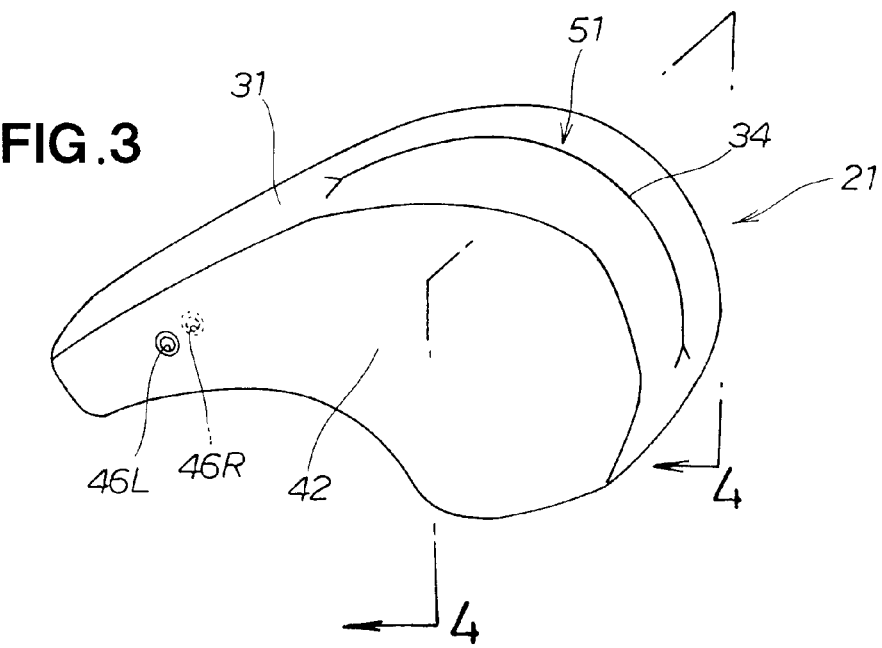
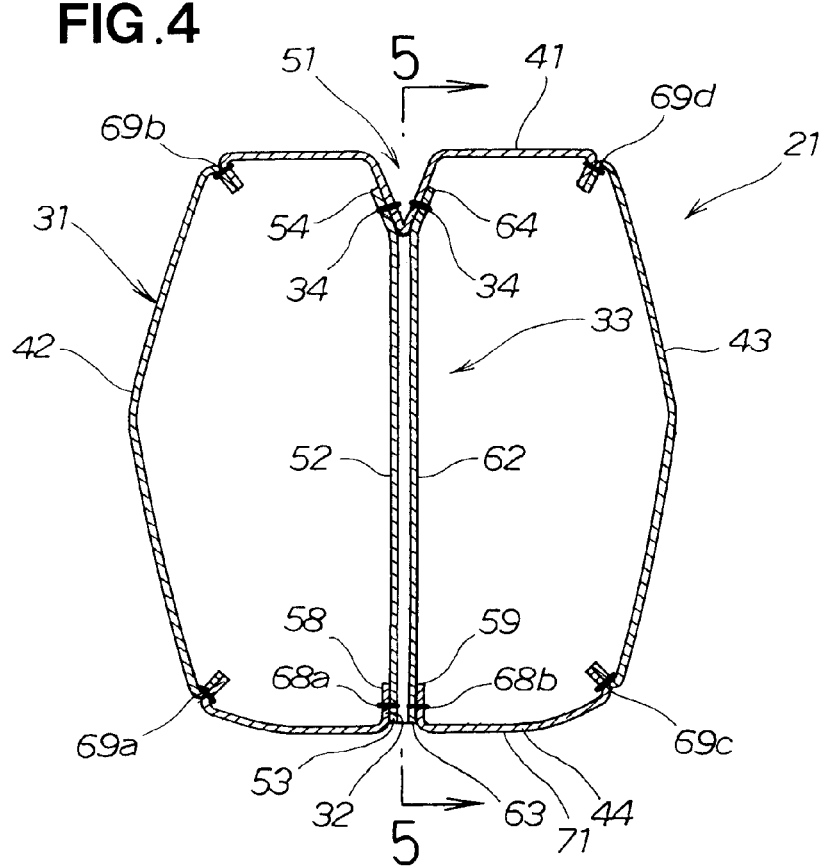

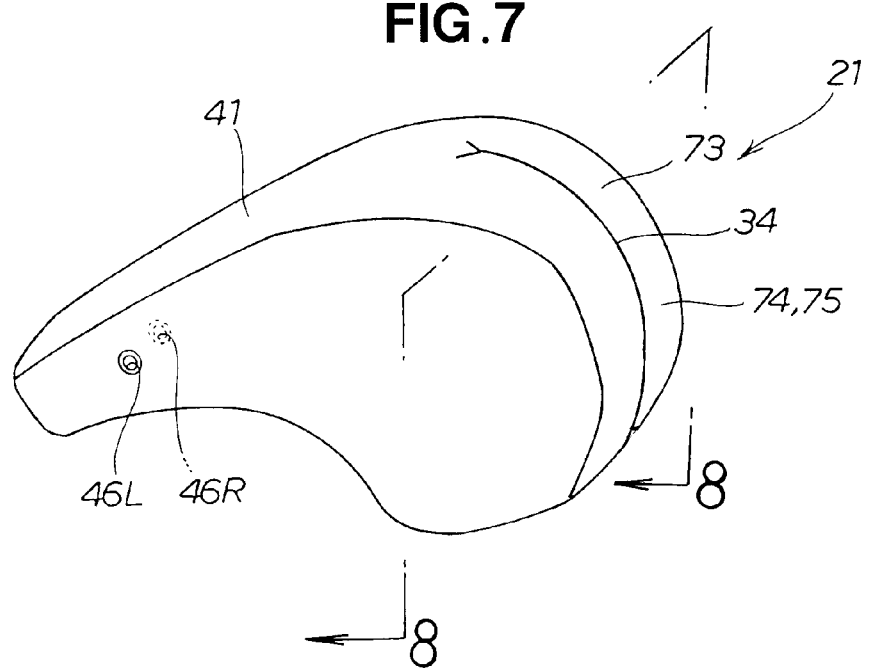
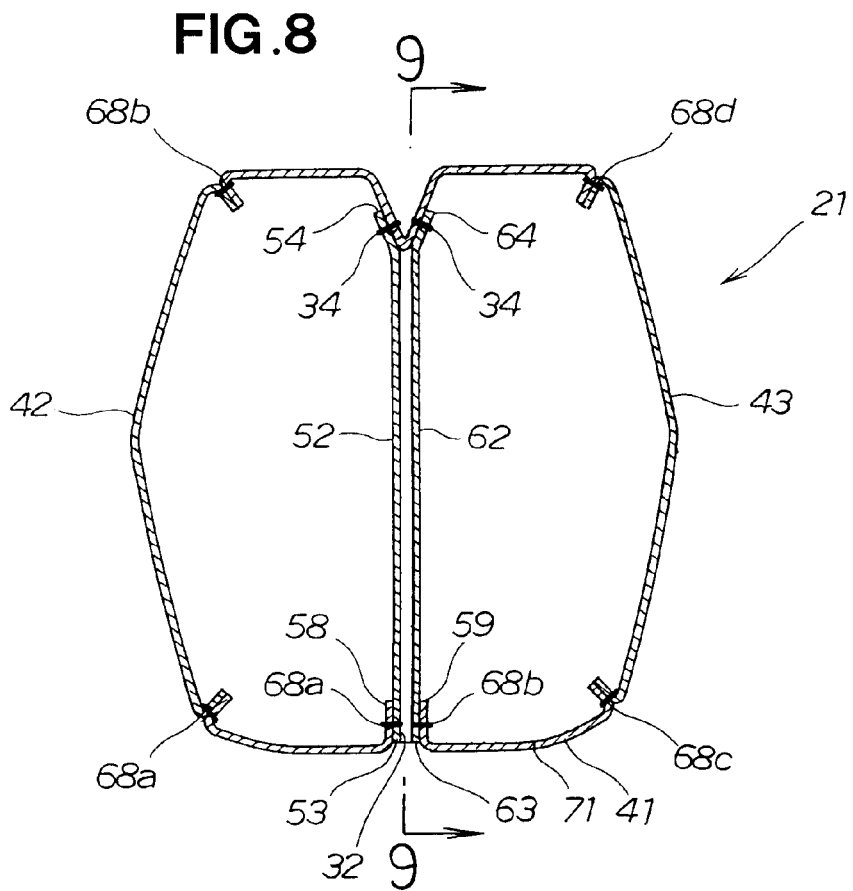

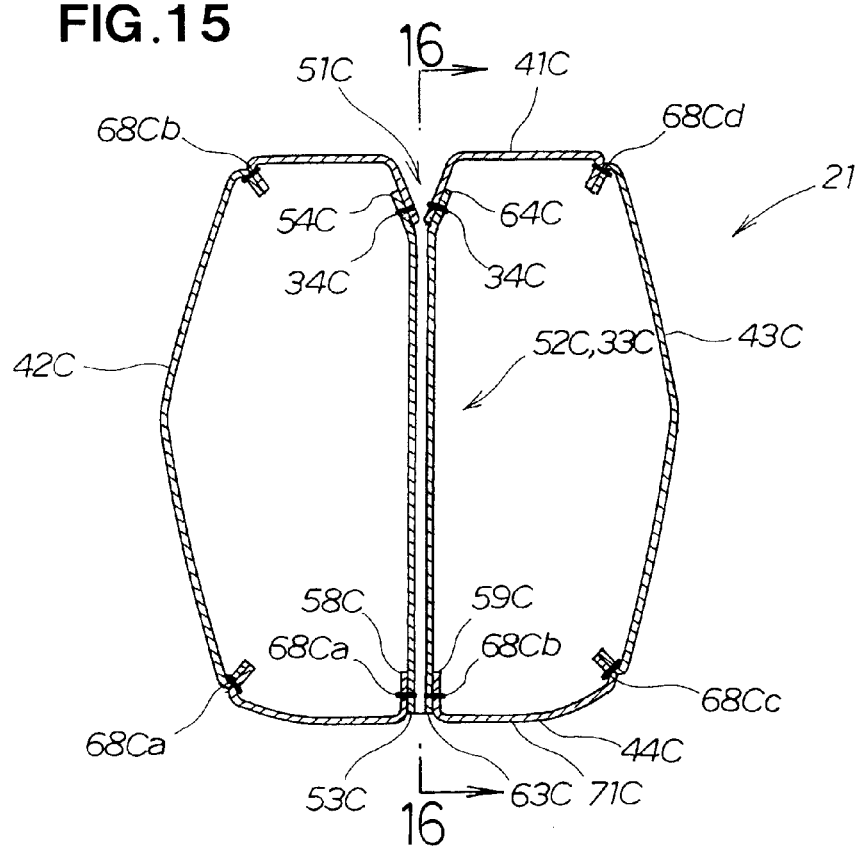
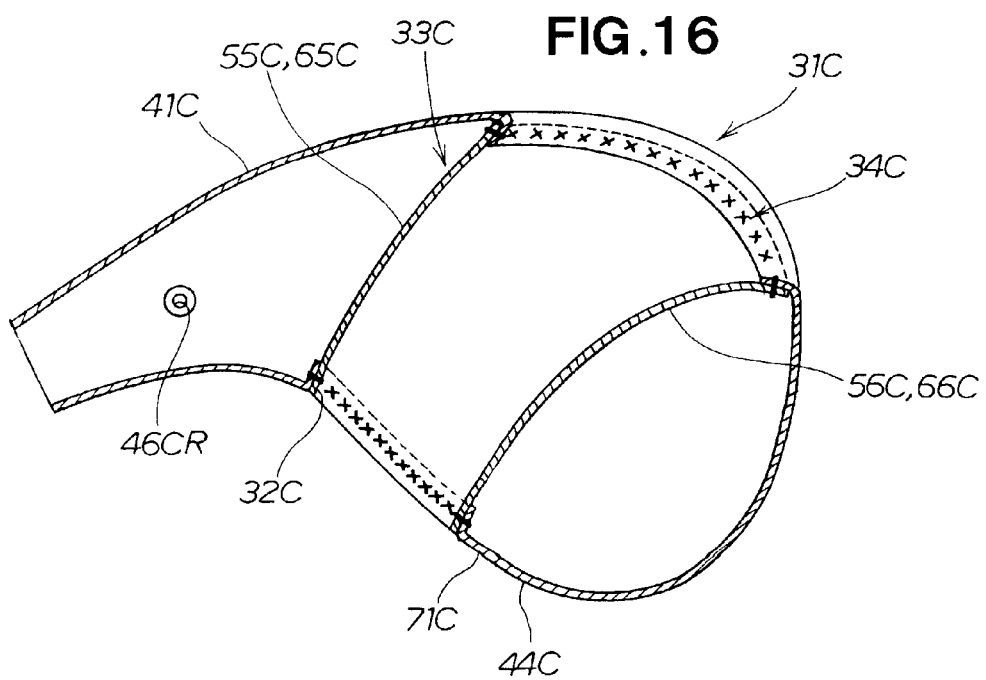

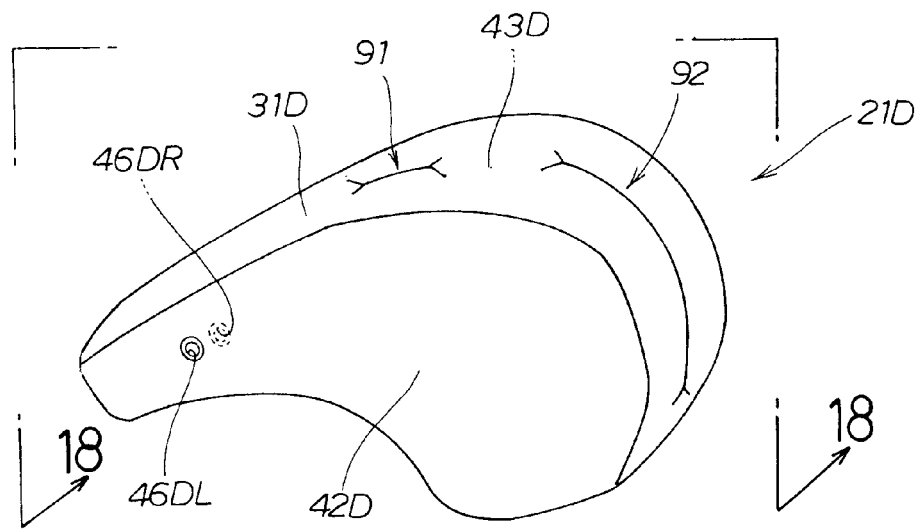
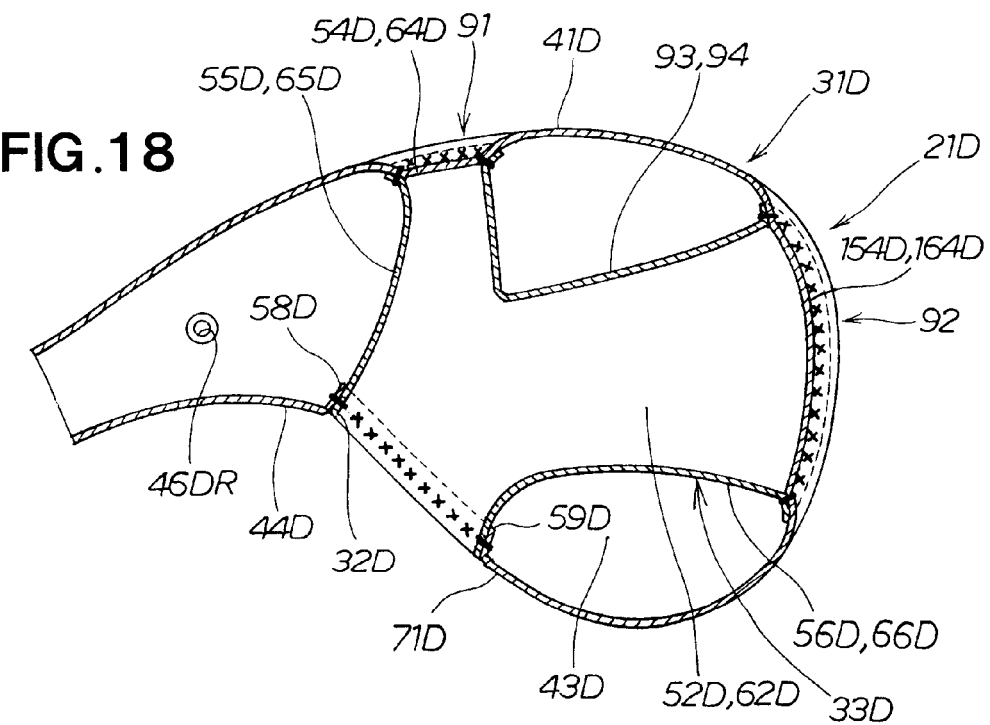

AIRBAG DEVICE

TECHNICAL FIELD

The present invention relates to an improvement in an airbag apparatus used in a vehicle.

BACKGROUND ART

Airbag apparatuses including airbags and inflators for generating gas to deploy the airbags are well known in the art, as disclosed in Patent Literatures 1 and 2 below.

The airbag apparatus disclosed in Patent Literature 1 includes a pocket having a recess-shape for receiving an object such as a rearward-facing child safety seat mounted on a passenger's seat when an airbag is deployed. The pocket is disposed to be opened downward when the airbag is deployed. The pocket is defined by fabrics having top portions sewed to one end of a strap. The other end of the strap is sewed to an inside of a top of the airbag. The strap, which is sewed to both the fabrics and the airbag, keeps the shape of the pocket when the airbag is deployed.

When the airbag is deployed, a top of the child safety seat mounted on the passenger's seat enters the pocket. The entry of the top of the child safety seat helps the airbag be deployed smoothly to sufficiently protect an infant on the seat.

The airbag apparatus in Patent Literature 1 have the greater number of components because of the strap sewn to both the fabrics and the inside of the airbag.

The airbag apparatus disclosed in Patent Literature 2 includes an airbag having left and right halves and a base communicating with the halves.

The airbag of the apparatus in Patent Literature 2 includes four base fabrics: an inner base fabric, an outer left base fabric, an outer right base fabric, and a proximal base fabric. These four base fabrics are sewn to one another to define a recess for restraining a passenger. The airbag has a larger area to allow the passenger to shift a longer distance in contact with the larger area, such that the passenger is appropriately restrained by the airbag.

The four fabrics have been cut into predetermined shapes. The airbag in Patent Literature 2 has a complex structure because the airbag has the four fabrics bent into complex shapes and sewed to one another. The airbag has a passenger-restraining force determined by the entire shape of the airbag. The shape of the airbag may not accommodate an object set on a passenger seat or a passenger of smaller or larger build.

There is need for an airbag apparatus including an airbag of simple structure for accommodating any build passenger or a seated object when the airbag is deployed.

PRIOR ART LITERATURE

Patent Literature

Patent Literature 1: Japanese Patent Publication No. 3746193

Patent Literature 2: Japanese Patent Laid-Open Publication No. 2004-314933

SUMMARY OF INVENTION

Technical Problem

An object of the present invention is to provide a vehicular airbag apparatus adapted to restrain various passengers or seated object by applying a small load thereto.

Solution to Problem

According to one aspect of the present invention, there is provided an airbag apparatus comprising: an airbag; an inflator for generating gas to deploy the airbag; the airbag including: a main bag having a bottom surface having an opening portion formed thereon; a small bag extending from the opening portion into the main bag; the small bag having a joined portion of a predetermined length joined to an inside of the main bag; and the airbag having the joined portion along a top, rear, or left and right surfaces thereof when the airbag is deployed, the top surface, the rear surface, or the left and right surfaces having groove portions bent toward the small bag.

Preferably, the small bag is continuous from the opening portion to the joined portion.

Preferably, the joined portion is provided in plural, the plural joined portions are disposed at plural locations on the main bag.

Preferably, the joined portion extends in a direction of deployment of the airbag.

Preferably, the small bag communicates with an outside of the airbag through the joined portion.

Preferably, the small bag extends upward from the opening portion, the small bag including horizontal restricting fabrics separate from each other at a branching portion of the small bag and extending in a left-and-right direction, the horizontal restricting fabrics being joined together at the branching portion.

Advantageous Effects of Invention

The airbag includes the main bag and the small bag. The small bag communicates with the opening portion formed in the bottom surface of the main bag for receiving an object to reduce a load applied from the airbag to the object. The airbag, which is formed by the two components, the main bag and the small bag, has a simple structure.

The small bag with the joined portion of predetermined length joined to the main bag restricts stretching of a portion of the airbag when the airbag is deployed, such that the portion of the airbag is bent inwardly to form a groove portion. Since the airbag has the groove portion, the airbag has a larger area for a passenger to make contact with. When the passenger comes into contact with the larger area of the airbag, a friction force between the area and the passenger acts in a direction normal to a direction of deployment of the airbag to help the deployed airbag restrain the passenger more efficiently. In addition, a friction force between fabrics of the small bag acts in such a manner as to allow the main bag to absorb energy more efficiently upon deformation of the main bag whatever part of the passenger abuts on the main bag. The air bag has its configuration which may be adjusted by change to a size and the joined portion of the small bag.

The airbag apparatus has a simple structure adapted to restrain various passengers or seated objects by applying a small load thereto. The simple structure of the airbag apparatus is less expensive, and effectively acts to retain and buffer a passenger's body.

The small bag, which is formed continuously from the bottom surface of the airbag, is deformable to such a greater degree. The greater degree of deformation of the small bag allows the airbag to protect an object in a greater stroke when the airbag is deployed. The greater degree of deformation of the small bag also allows for effective use of friction force between the restricting fabrics.

The joined portions are disposed at the plurality of locations on the airbag. The locations and shapes of the joined portions may vary to provide the airbag with an improved function to protect passengers of different builds.

The extension of the joined portion in the direction of deployment of the airbag allows the groove portion of the airbag to apply a restraining force in a direction of a passenger so as to reduce impact of the passenger on the groove portion.

The communication of the small bag with the outside of the airbag through the joined portion allows one part of a passenger's body to enter the small bag when the airbag is deployed. The airbag has a large area for contact with the passenger's body with the one part of the passenger's body in the small body. The large area in contact with the passenger's body exerts a reduce pressure on the passenger's body.

BRIEF DESCRIPTION OF DRAWINGS

FIG. 3 is a perspective view of the deployed airbag in Embodiment 1;

FIG. 4 is a cross-sectional view taken along line 4-4 of FIG. 3;

FIG. 7 shows an alternative to the airbag shown in FIG. 3;

FIG. 8 is a cross-sectional view taken along line 8-8 of FIG. 7;

FIG. 15 is a cross-sectional view of an airbag in Embodiment 3;

FIG. 16 is a cross-sectional view taken along line 16-16 of FIG. 15;

FIG. 17 is a perspective view of a deployed airbag in Embodiment 4;

FIG. 18 is a cross-sectional view taken along line 18-18 of FIG. 17; and

MODE FOR CARRYING OUT THE INVENTION

Certain preferred embodiments of the present invention are described below with reference to the accompanying drawings.

Embodiment 1

Figure 1:
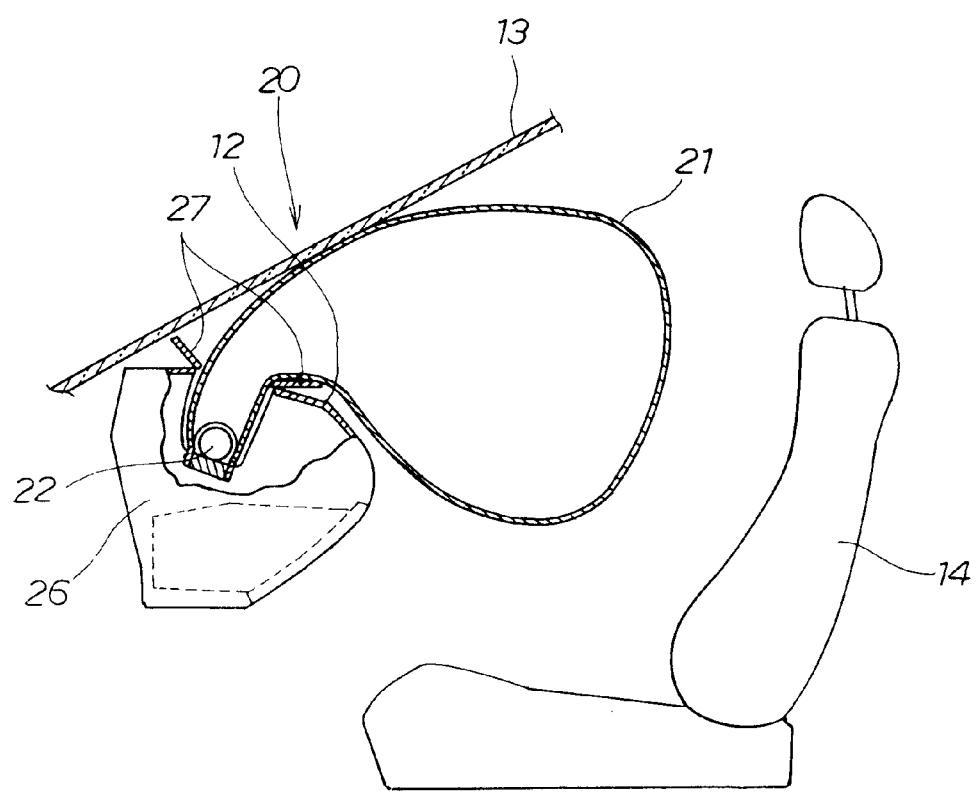
FIG. 1 is a cross-sectional view of an airbag apparatus having an airbag deployed in front of a passenger's seat.
Figure 2A:
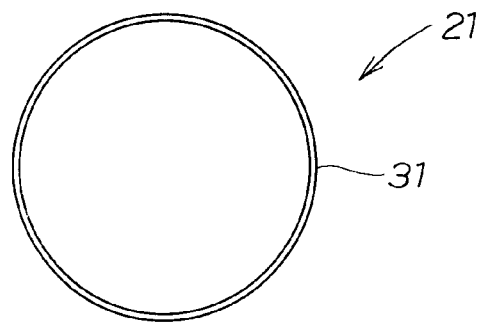
FIGS. 2A, 2B, 2C, and 2D show a process for manufacturing the airbag.
Figure 2B:
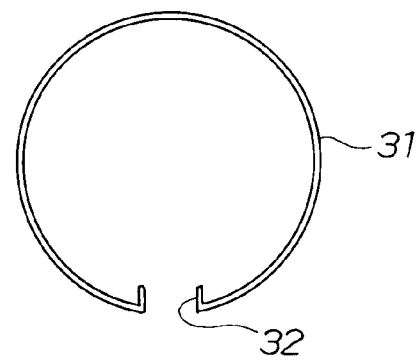
Figure 2C:
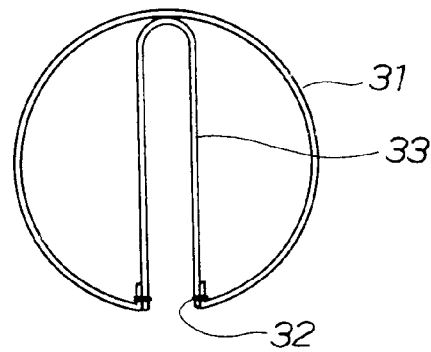
Figure 2D:
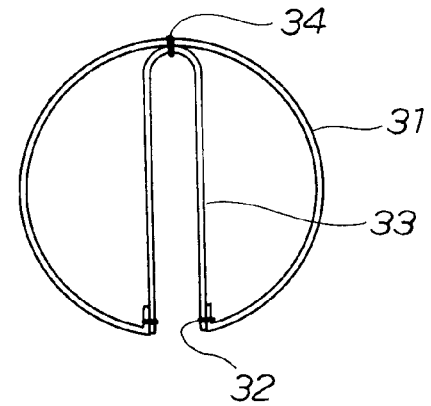

As shown in FIG. 1, an airbag apparatus 20 includes an airbag 21 for a passenger (not shown) sitting on a passenger seat 14, an inflator 22 for generating a gas to deploy the airbag 21, and a case 26 for accommodating therein the airbag 21 and the inflator 22. The case 26 has a lid 27 configured to break during deployment of the airbag. The airbag 21, when deployed, is positioned between the windshield 13 and the passenger seat 14, as illustrated in FIG. 1.

The airbag apparatus 20 is disposed at an upper part of a space formed inside an instrument panel 12. The airbag 21 and the inflator 22 are joined together in an airtight manner so that the airbag 21 can be smoothly deployed by a gas generated by the inflator 22.

FIG. 2 shows a process for manufacturing the airbag 21 in Embodiment 1. As shown in FIG. 2(a), the airbag 21 includes a main bag 31 configured to have a circular cross-section when the main bag 31 is deployed. FIG. 2(b) shows a step of forming an opening portion 32 in the main bag 31. FIG. 2(c) shows a step of providing a small bag 33 smaller in size than the main bag 31 and sewing the small bag 33 to the opening portion 32 of the main bag 31 with the small bag 33 placed within the main bag 31. FIG. 2(d) shows a step of joining a portion 34 of the small bag 33 to the main bag 31 to provide the air bag 21.

The airbag 21 includes the main bag 31 having the opening portion 32 formed therein, and the small bag 33 extending from the opening portion 32 into the main bag 31.

Figure 5:
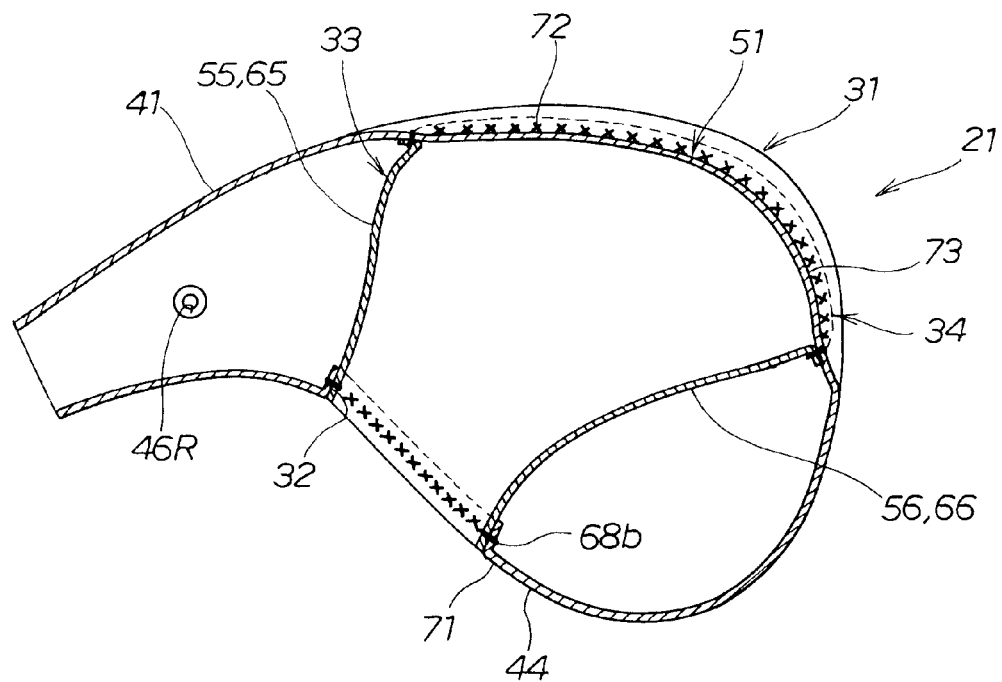
FIG. 5 is a cross-sectional view taken along line 5-5 of FIG. 4.

Referring to FIGS. 3 to 5, the main bag 31 includes a top base fabric 41, left and right base fabrics 42, 43 disposed on left and right sides of the top base fabric 41, respectively, and a bottom base fabric 44 extending between and connected to lower ends of the fabrics 42, 43. The left and right base fabrics 42, 43 include vents 46L, 46R, respectively, for allowing discharge of air out of the airbag 21 so as to reduce an external force applied to the airbag 21.

The top base fabric 41 has a downwardly bent V-shaped groove portion 51 formed on a center portion extending longitudinally thereof. The bottom base fabric 44 has flanges 58, 59 defining the opening portion 32 therebetween. From the opening portion 32 to the V-shaped groove portion 51 extend left and right restricting fabrics 52, 62 for restricting expansion of the airbag 21.

The restricting fabrics 52, 62 have lower ends 53, 63 disposed within the opening portion 32 and joined to the flanges 58, 59 of the bottom base fabric 44. The restricting fabrics 52, 62 have upper ends 54, 64 joined to the V-shaped groove portion 51 of the top base fabric 41. The restricting fabrics 52, 62 have front ends 55, 65 joined together. The restricting fabrics 52, 62 have rear ends 56, 66 joined together. The small bag 33 is a bag formed by the left and right restricting fabrics 52, 62 joined together at the front and rear ends 52, 62, 56, 66 and joined to the top base fabric 41 and the bottom base fabric 44.

The small bag 33 is disposed within a space defined by the airbag 21 in such a manner that the opening portion 32 is oriented downwardly when the air bag 21 is expanded.

The small bag 33, which is formed continuously from the opening portion 32 of the bottom base fabric 44 to the joining location or portion 34, is deformable to such a greater degree than when the small bag 33 is not continuously formed from the opening portion 32 to the joined portion 34. The greater degree of deformation of the small bag 33 allows the airbag 21 to protect an object in a greater stroke when the airbag 21 is deployed. The greater degree of deformation of the small bag 33 also allows for effective use of friction force between the restricting fabrics 52, 62.

The joined portion 34 where the left and right restricting fabrics 52, 62 are joined to the V-shaped groove portion 51 of the top base fabric 41 of the main bag 31 extends in a direction of deployment of the airbag 21, lying along a top surface 72 of the airbag 21 and a retention surface 73 of the airbag 21 for retaining a passenger thereon when the airbag 21 is deployed. Gas generated by the inflator flows in the direction of deployment of the airbag 21. This flow of gas allows smooth of deployment of the airbag 21.

In FIG. 4, the opening portion 32 is joined to the left and right restricting fabrics 52, 62 at locations 68a, 68b. The fabrics of the main bag 31 are joined together at locations 69a, 69b, 69c, 69d.

Figure 6:
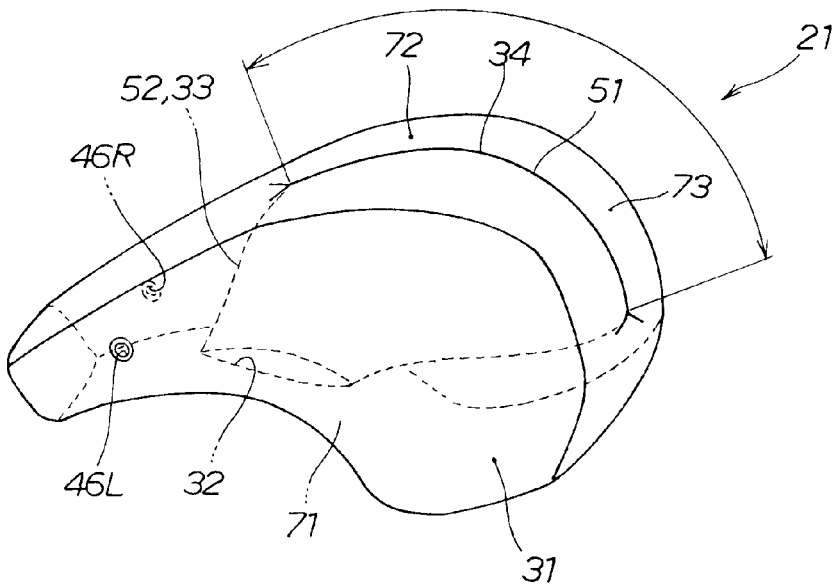
FIG. 6 is a perspective view of the airbag in Embodiment 1.
Figure 9:
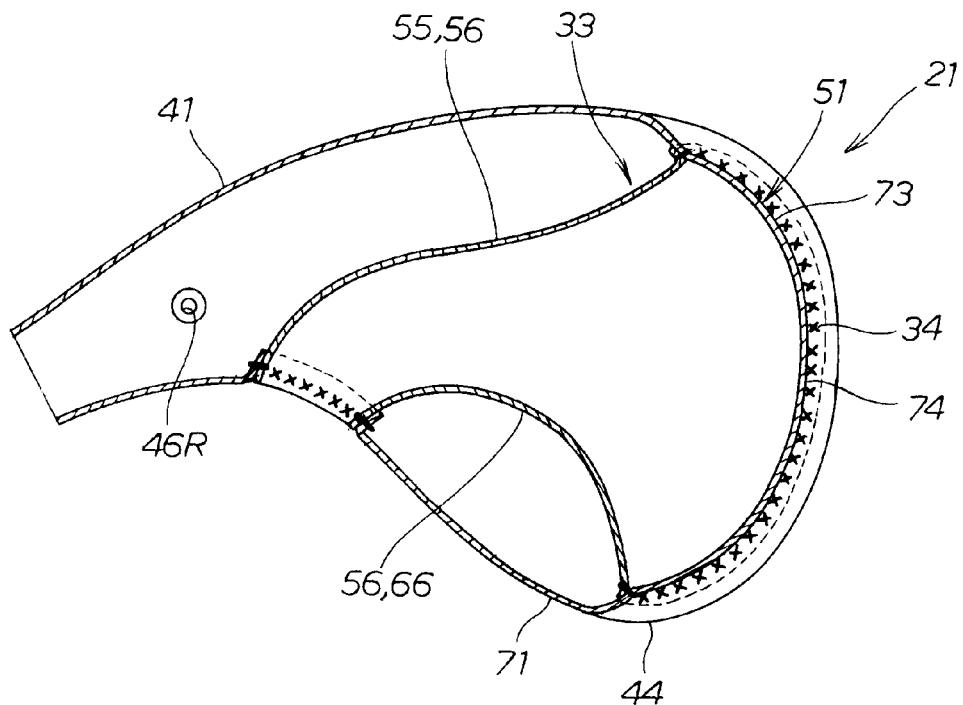
FIG. 9 is a cross-sectional view taken along line 9-9 of FIG. 8.

Referring to FIG. 6, the restricting fabrics 52, 62 of the small bag 33 are joined to the opening portion 32 of a bottom surface 71 of the airbag 21 with the joined portion 34 joined to the main bag 31. The joined portion 34 extends a predetermined length corresponding to the V-shaped groove portion 51 formed on the top surface 72 and the retention surface 73.

The airbag 21 includes the main bag 31 and the small bag 33. The small bag 33 is disposed with the opening portion 32 oriented downwardly for allowing an object to enter the main bag 31 through the opening portion 32, such that the object is subjected to a reduced load applied from the airbag 21.

The airbag 21, which is formed by the two members, the main bag 31 and the small bag 33, has a simple structure.

The small bag 33 with the joined portion 34 joined to the main bag 31 along a predetermined length of a portion of the airbag 21 restrict stretching of the portion of the airbag 21 during deployment of the airbag 21, such that the portion of the airbag 21 is bent inwardly to form the V-shaped groove portion 51. The airbag 21, which includes the V-shaped groove portion 51, has a larger area for a passenger to make contact with. When the passenger comes into contact with the larger area of the airbag 21, a friction force between the passenger and the airbag 21 acts in a direction perpendicular to the direction of deployment of the airbag to help the airbag 21 hold the passenger more efficiently.

A friction force between the restricting fabrics 52, 62 acts in such a manner as to allow the main bag 31 to absorb energy more efficiently upon deformation of the main bag whatever part of a passenger abuts on the main bag 31. The small bag 33 may have its size or the joined portion 34 varied to adjust a configuration of the airbag 21.

The airbag apparatus 20, which has the airbag 21 of simple structure discussed above, may accommodate different passengers or seated objects and retain a passenger by applying a small load to the passenger. In other words, an excess cost is not required to provide the airbag apparatus 20 of simple structure designed to buffer impact of the passenger on the airbag and retain the passenger effectively.

The small bag 33 with the joined portion 34 joined to the main bag 31 along any part of the airbag 21 restricts stretching of the part of the airbag 21 when the airbag 21 is deployed, such that the part of the deployed airbag 21 is bent inwardly. The airbag 21 has a simple structure having its configuration adjusted by change to the size and the joined portion 34 of the small bag 33.

The airbag 21 has the main bag 31 and the small bag 33 with the joined portion 34 joined to the main bag 31 to provide the V-shaped groove portion 51. Unlike the airbag 21, a prior art airbag would have a complex structure having fabrics of different shapes joined (or sewed) together if the airbag is required to provide a three-dimensional shape having for a V-shaped groove portion such as the V-shaped groove portion 51. The complex structure would result in increased manufacturing cost.

In contrast to the prior art airbag, the airbag 21 in Embodiment 1 has a simple structure having the main bag 31 and the small bag 33 joined at the joined portion 34 to the main bag 31. The deployed airbag 21 has a dented configuration without requiring a complex structure having the large number of fabrics or fabrics sewed together to provide a three-dimensional shape.

The airbag 21 may have the V-shaped groove portion 51 in different locations to provide various dented configurations or retain a passenger at various positions. The various dented configurations or the various positions to retain the passenger result in the airbag having various characteristics. The V-shaped groove portion 51 has an inwardly dented configuration of the deployed airbag 21 having a smaller volume. The airbag 21 is deployed into the smaller volume in a shorter time.

The airbag apparatus 20 of simple structure accommodates various passengers or seated objects, retaining the passengers or the objects by applying a small load thereto. In other words, the airbag apparatus 20 has a structure designed to better retain or buffer a passenger's body without requiring an excess cost.

The airbag apparatus 20 may have a modified air bag which will be discussed below with reference to FIGS. 7 to FIG. 10.

Referring to FIGS. 7 to 10, the modified airbag 21 differs from the airbag shown in FIG. 3 to FIG. 6 in that when deployed, the modified air bag 21 has the joined portion 34 extending along the retention surface 73 and a rear portion 74 of a top base fabric defining a rear surface 74 of the airbag. The modified airbag 21 is similar in other respects to the airbag shown in FIGS. 3 to 6. The joined portion 34 extending along the retention surface 73 and the rear portion 74 results from changes made to shapes and locations of restricting fabrics shown in FIGS. 3 to 6.

Figure 10:
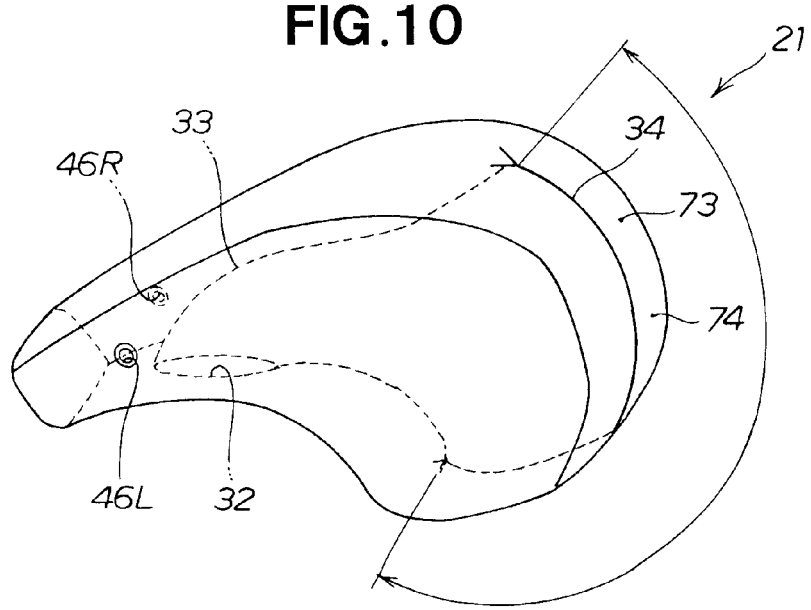
FIG. 10 is a perspective view of the airbag shown in FIG. 7.

Turning to FIG. 10, the joined portion 34 extends along the retention surface 73 for retaining a passenger and the rear surface 74 when the airbag 21 is deployed.

The small bag 33 with the joined portion 34 joined to the main bag 31 restricts stretching of a portion of the airbag 21 when the airbag 21 is deployed, so that the portion of the airbag 21 is inwardly bent. The airbag 21 may have its simple structure having a configuration adjusted varying the size and joined portion 34 of the small bag 33. In other words, the airbag 21 of simple structure better retains or buffers a passenger's body.

Embodiment 2

Next, an airbag 21B in Embodiment 2 will be discussed with reference to FIGS. 11 to 13. The airbag has the joined portion 34 extending along lateral V-shaped groove portions 83, 84 formed on left and right base fabrics 42B, 43B.

Figure 11:
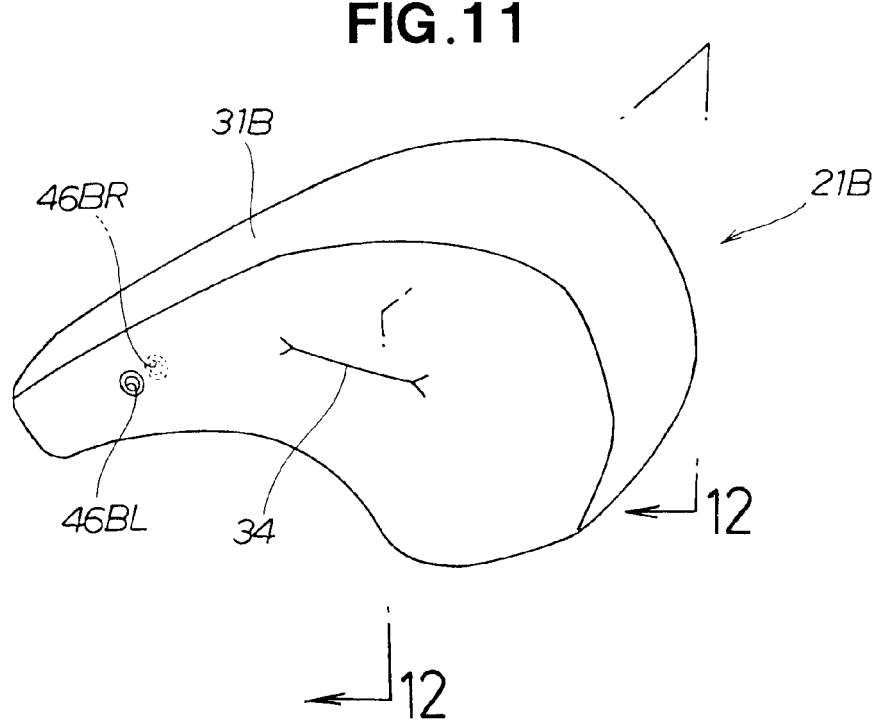
FIG. 11 is a perspective view of a deployed airbag in Embodiment 2.
Figure 12:
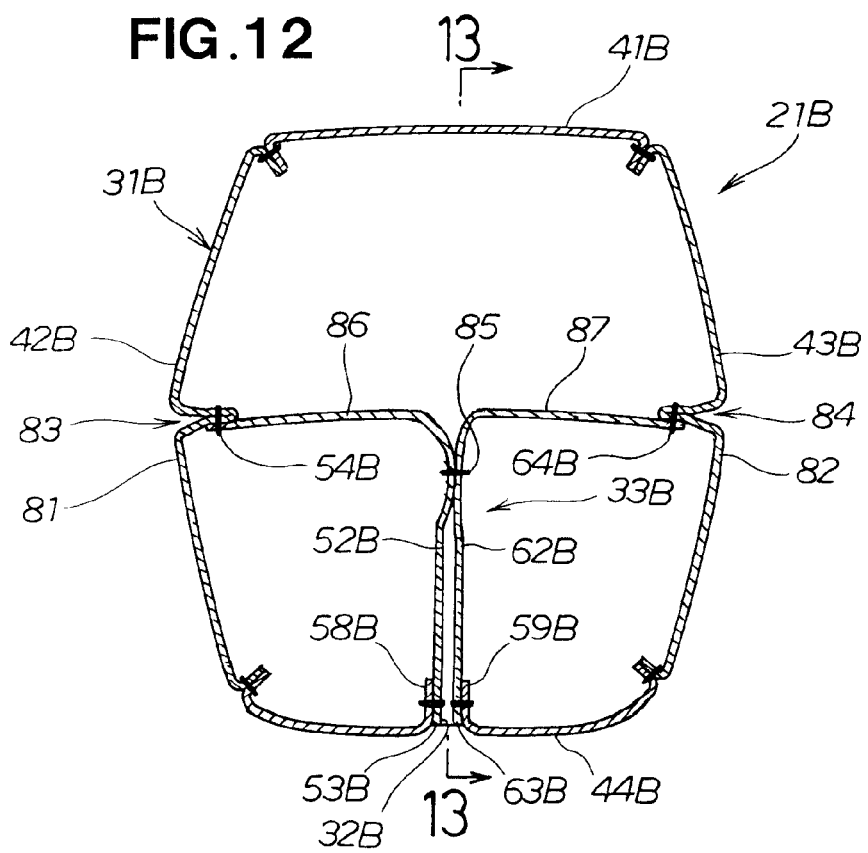
FIG. 12 is a cross-sectional view taken along line 12-12 of FIG. 11.
Figure 13:
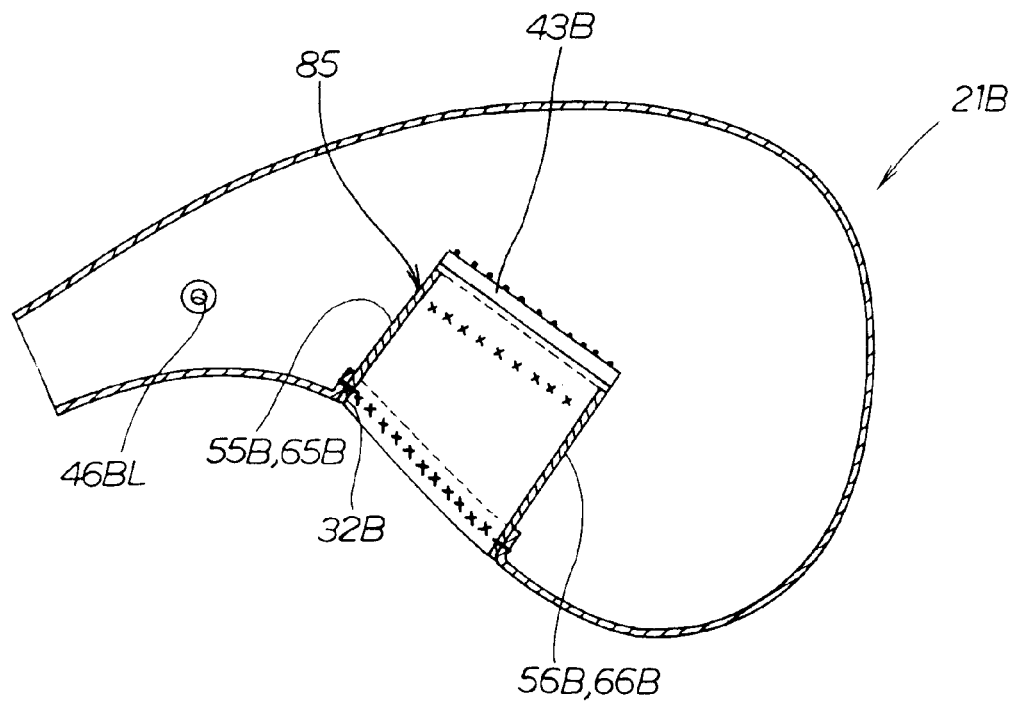
FIG. 13 is a cross-sectional view taken along line 13-13 of FIG. 12.
Figure 14:
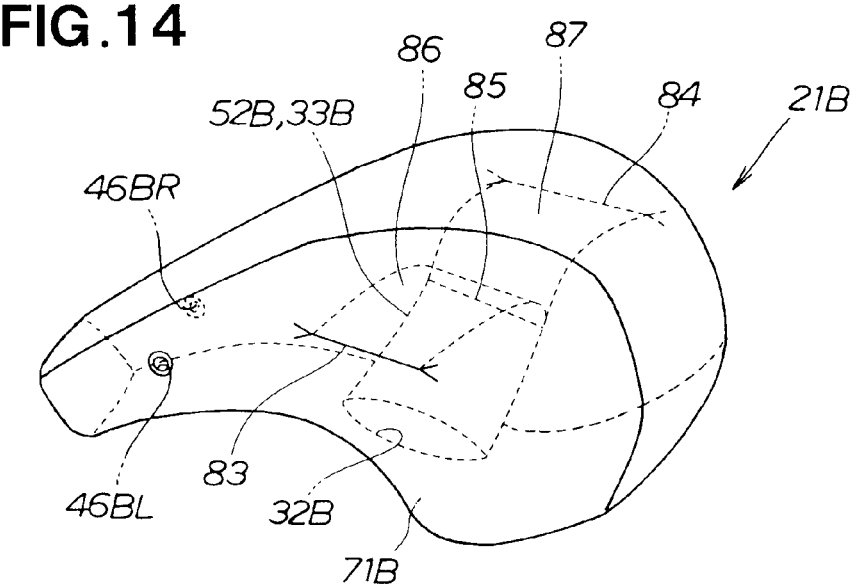
FIG. 14 is a perspective view of the airbag shown in FIG. 11.

Referring to FIGS. 11 to 13, the airbag 21B includes a main bag 31B having a top base fabric 41B, left and right base fabrics 42B, 43B disposed left and right sides of the top base fabric 41B, and a bottom base fabric 44B extending between and connected to lower ends of the left and right base fabrics 42B, 43B. The left and right base fabrics 42B, 43B have vents 46BL, 46BR, respectively.

The left base fabric 42B has a substantially middle portion 81 partly joined to the joined portion of the small bag and bent inwardly of the air bag 21B to form the lateral or left V-shaped groove portion 83. The right base fabric 43B has a substantially middle portion 82 partly joined to the joined portion of the small bag and bent inwardly of the airbag 21B to form the lateral or right V-shaped groove portion 84.

Left and right restricting fabrics 52B, 62B extend from opening portions 32B defined between flanges 58B, 59B of the bottom base fabric 44B to the left and right V-shaped groove portions 83, 84, respectively. The restricting fabrics 52B, 62B have lower ends 53B, 63B disposed within the opening portion 32B and joined to the flanges 58B, 59B.

The restricting fabrics 52B, 62B have upper ends 54B, 64B joined to the V-shaped groove portions 83, 84, respectively. The restricting fabrics 52B, 62B have front ends 55B, 65B (FIG. 13) joined together.

The left and right restricting fabrics 52, 62B have rear ends 56B, 66B joined together.

The left and right restricting fabrics 52, 62B extending from the opening portion 32B to the V-shaped groove portions 83, 84 define the small bag 32B.

The airbag 21B has the small bag 33B disposed within the main bag 31B for restricting local expansion of the airbag 21B. The small bag 33B is disposed with the opening portion 32B facing downward when the airbag 21B is deployed.

The left and right restricting fabrics 52B, 62B both extend upwardly to a branching portion 85 of the small bag 33B joining the fabrics 52B, 62B together. The left restricting fabric 52B extends leftward from the branching portion 85 and the right restricting fabric 62B extends rightward from the branching portion 85. In other words, the small bag 33B includes horizontal restricting fabrics 86, 87 extending between and joined to the V-shaped groove portions 83, 84, respectively.

The airbag 21B includes the main bag 31B and the small bag 33B joined at the joined portion 34 to each of the lateral V-shaped groove portions 83, 84 formed on the main bag 31B. The horizontal restricting fabrics 86, 87 have ends defining the upper ends 54B, 64B of the left and right restricting fabrics 52B, 62B. These ends of the fabrics 86, 87 are joined to the lateral V-shaped groove portions 83, 84. This arrangement provides a simple structure of the airbag 21B. The small bag 33B with the horizontal restricting fabrics 86, 87 each joined at the joined portion to the main bag 31B restrict portions of the airbag 21B when the airbag 21B is deployed, such the portions of the airbag 21B are bent inwardly to form the V-shaped groove portions 83, 84. The airbag 21B may have a simpler structure having a configuration adjusted varying the size and joined portion of the small bag.

The airbag 21B has the simple structure designed to retain and buffer a passenger's body. The airbag 21B, which includes the inwardly bent V-shaped groove portions, has a smaller volume. The airbag 21B is expanded to have the smaller volume in a shorter time.

Embodiment 3

The airbag apparatus according to the present invention may have an airbag 21C shown in FIG. 15 and FIG. 16. The airbag 21C includes a main bag 31C having a V-shaped groove portion 51 extending through the main bag 31C, and a small bag 33C joined at a joined portion 34C to the main bag 31C.

The airbag 21C shown in FIG. 15 and FIG. 16 differs from the airbag shown in FIG. 4 and FIG. 5 in that the small bag 33C communicates with an outside of the airbag 21C through the joined portion 34C. The airbag 21C shown in FIG. 15 and FIG. 16 is similar in other respects to the airbag shown in FIG. 4 and FIG. 5. In other words, a pocket defined by the small bag 33C of the airbag 21C communicates with the outside of the airbag 21C. This allows a part of a passenger's body to enter the small bag 33C when the airbag 21C is deployed. The passenger's body with its portion in the small bag 33C can be in contact with a larger area of the airbag 21C to reduce a less pressure exerted on the body.

Embodiment 4

An airbag 21D in Embodiment 4 will be discussed with reference to FIG. 17 to FIG. 19. The airbag 21D has V-shaped groove portions 91, 92 on a top base fabric 41D of a main bag 31D.

Figure 19:
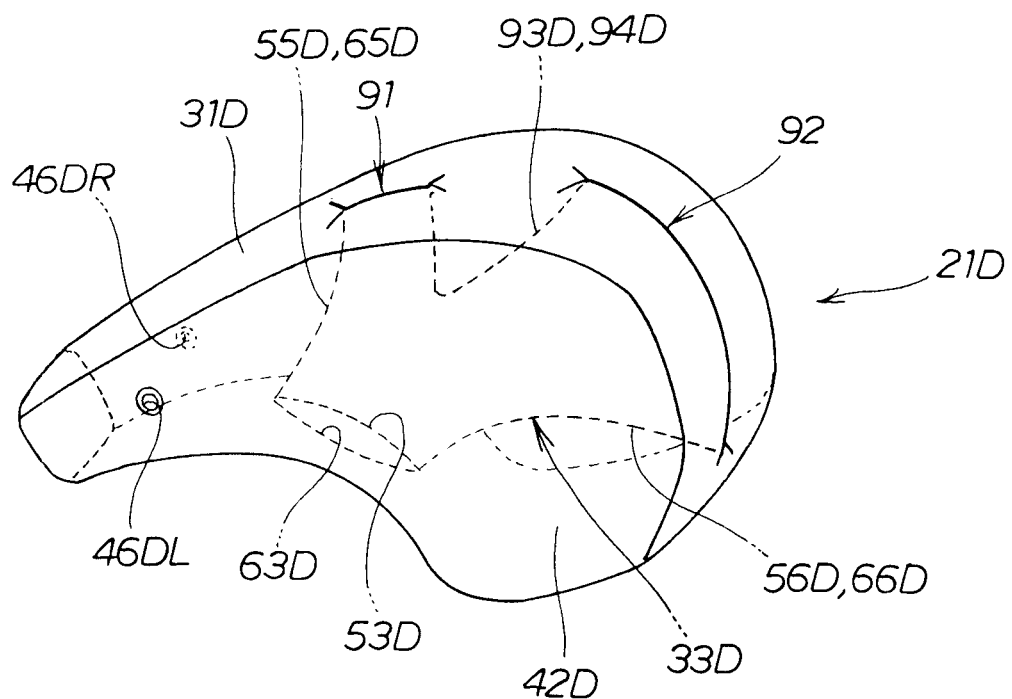
FIG. 19 is a perspective view of the airbag shown in FIG. 17.

As shown in FIG. 17 to FIG. 19, the main bag 31D of the airbag 21D includes the top base fabric 41D, left and right base fabrics 42D, 43D disposed left and right sides of the top base fabric 41D, and a bottom base fabric 44D extending between lower ends of the left and right base fabrics 42D, 43D. The left and right base fabrics 42D, 43D have vents 46DL, 46DR, respectively.

The top base fabric 41D has front and rear V-shaped groove portions 91, 92 bent inwardly and disposed on a longitudinal central axis of the top base fabric 41D.

The bottom base fabric 44D has an opening portion 32D formed therethrough. Left and right restricting fabrics 52D, 62D extend upward from the opening portion 32D to the front and rear V-shaped groove portions 91, 92.

The left and right restricting fabrics 52D, 62D have lower ends 53D, 63D joined to flanges 58D, 59D defining the opening portion 32D. The left and right restricting fabrics 52D, 62D have upper ends 54D, 64D joined to the front V-shaped groove portion 91. The restricting fabrics 52D, 62D have rear ends 154D, 164D joined to the rear V-shaped groove portion 92. The fabrics 52D, 62D have front ends 55D, 65D joined together.

Between the front and rear V-shaped groove portions 91, 92 are V-shaped side portions 93, 94 each having a V shape when viewed in side elevation. The left and right restricting fabrics have rear ends 56D, 66D joined together. The left and right restricting fabrics 52D, 62D extending from the opening portion 32 to the front and rear V-shaped groove portions 91, 92 define the small bag 33D.

The restricting fabrics of the small bag 33D are disposed within the main bag 31D for restricting expansion of the airbag 21D. The small bag 33D is disposed with the opening portion 32D facing downwardly when the airbag 21D is deployed. The small bag 33D extends from the opening portion 32D of the bottom base fabric 44D defining a bottom surface 71D of the airbag, to the front and rear V-shaped grooves 91, 92 formed on the top base fabric 41D.

The small bag 33D has front and rear joined portions joined to the front and rear V-shaped groove portions 91, 92, respectively. The airbag 21D, which includes the joined portions of the small bag, can more effectively protect passengers of different builds. The small bag 33D may have three to five joined portions joined to the main bag 31D.

The locations and sizes of the joined portions of the small bag 33D may vary to accommodate passengers of different builds for more effective protection of the passengers.

The air bags in Embodiments 1 to 4 are applicable to a vehicle such as four-, or three-wheeled ones.

INDUSTRIAL APPLICABILITY

The airbag apparatus according to the present invention is preferably use in a four-wheeled vehicle.

Reference Signs List 12 instrument panel
20 airbag apparatus
21 airbag
22 inflator
31 main bag
32 opening portion
33 small bag
34 joined portion
71 bottom surface of the airbag
72 top surface of the airbag
73 retention surface
74 rear surface of the airbag

The invention claimed is:

1. An airbag apparatus comprising:
an airbag;
an inflator for generating gas to deploy the airbag;
the airbag having an open end air-tightly connected to the inflator, and when the airbag is deployed, the airbag has a rear surface located remote from the open end for being in contact with an occupant, and a top surface, a bottom surface, a left surface, and a right surface that extend from the open end toward the rear surface of the airbag;

the airbag including:

a main bag having a bottom surface forming the bottom surface of the airbag and having an opening portion formed thereon, said main bag defining an interior space and having a first volume;

a small bag extending from the opening portion into the main bag so as to be received in the interior space of the main bag, said small bag defining a second volume, said second volume being less than said first volume;

the small bag having a joined portion of a predetermined length joined to an inside of the main bag;

the airbag having the joined portion along the top surface, rear surface, or the left and right surfaces thereof when the airbag is deployed, the top surface, the rear surface, or the left and right surfaces having groove portions bent toward the small bag; and the joined portion extends in a direction of deployment of the airbag.

2. The airbag apparatus of claim 1, wherein the small bag is continuous from the opening portion to the joined portion.

3. The airbag apparatus of claim 1, wherein the joined portion is provided in plural, the plural joined portions are disposed at plural locations on the main bag.

4. The airbag apparatus of claim 1, wherein the small bag communicates with an outside of the airbag through the joined portion.

5. The airbag apparatus of claim 1, wherein the small bag extends upward from the opening portion, the small bag including horizontal restricting fabrics separate from each other at a branching portion of the small bag and extending in a left-and-right direction, the horizontal restricting fabrics being joined together at the branching portion.

* * * * *